United States Patent [19]
Kim

[11] Patent Number: 6,144,700
[45] Date of Patent: *Nov. 7, 2000

[54] METHOD AND APPARATUSES FOR REMOVING BLOCKING EFFECT IN A MOTION PICTURE DECODER

[75] Inventor: Sang-Ho Kim, Seoul, Rep. of Korea

[73] Assignee: Daewoo Electronics Co., Ltd., Seoul, Rep. of Korea

[*] Notice: This patent is subject to a terminal disclaimer.

[21] Appl. No.: 08/856,474

[22] Filed: May 14, 1997

[30] Foreign Application Priority Data

| May 14, 1996 | [KR] | Rep. of Korea | 96-16005 |
| May 14, 1996 | [KR] | Rep. of Korea | 96-16006 |
| May 14, 1996 | [KR] | Rep. of Korea | 96-16007 |
| May 14, 1996 | [KR] | Rep. of Korea | 96-16011 |

[51] Int. Cl.[7] ........................................... G06K 9/00
[52] U.S. Cl. ........................ 375/240; 348/410; 382/251; 382/199
[58] Field of Search ................................ 348/700, 420, 348/421, 699, 416, 403, 410; 382/250, 236, 238, 244, 248, 251, 199; 375/240

[56] References Cited

U.S. PATENT DOCUMENTS

| 5,245,677 | 9/1993 | Lepore et al. | 382/272 |
| 5,337,088 | 8/1994 | Honjo | 348/420 |
| 5,475,434 | 12/1995 | Kim . | |
| 5,563,662 | 10/1996 | Kishi . | |
| 5,852,475 | 12/1998 | Gupta et al. | 348/475 |
| 5,852,682 | 12/1998 | Kim | 382/268 |

OTHER PUBLICATIONS

T. Jarske, P. A Haavisto, I. Defe'e, IEEE Digest of Technical Paper, WPM 13.2, pp. 218–219; "Post–Filtering Methods For Reducing Blocking Effects From Coded Images", (Jun. 21–23, 1994). Jun. 27, 1994.

*Primary Examiner*—Chris S. Kelley
*Assistant Examiner*—Dave Bayless
*Attorney, Agent, or Firm*—Pillsbury Madison & Sutro LLP

[57] ABSTRACT

Methods and apparatus for removing blocking effect in a motion picture decoder are provided. Boundary pixel values of a current block and corresponding adjacent blocks are extracted boundary. A mean value for the resulting difference values between the extracted pixel values of the current and adjacent blocks is calculated. The calculated mean value is limited within a range of −(½) quantization step size to (½) quantization step size. The limited mean value is added to the each of the pixel values of the current block to generate. In another aspect, absolute values for the difference values between boundary pixel values of the current and adjacent blocks are calculated. The calculated absolute values are compared with a threshold level to determine whether the current block contains an edge. Therefore, only the current block not having an edge is selected and filtered, thereby removing the blocking effect due to a quantization error without having distortion to the original data.

7 Claims, 7 Drawing Sheets

METHOD AND APPARATUSES FOR REMOVING BLOCKING EFFECT IN A MOTION PICTURE DECODER

BACKGROUND OF THE INVENTION

1. Field of the Invention

The present invention relates to methods and apparatuses for removing blocking effect caused by quantization error in a motion picture decoder.

2. Description of the Prior Art

In general, the amount of data associated with visual information is so large that its storage would require enormous storage capacity. Although the capacities of utilizing several storage media are substantial, the access speeds are usually inversely proportional to the capacity. Storage and transmission of such data require large capacity and bandwidth. To eliminate the need for large storage capacity, there is an image data compression technique, which reduces the number of bits required to store or transmit image without any appreciable loss of data.

The image data compression removes redundancies contained in image signals. The redundancies comprises a spectral redundancy among colors, a temporal redundancy between successive screens, a spatial redundancy between adjacent pixels within the screen, and a statistical redundancy. Here, a method of image coding for removing the spatial redundancy is transform coding, which divides original input images into small size blocks and processes them individually.

In the transmitter, each blocks of original image is converted by the transform coding and transform coefficients are generated. The transform coefficients are quantized and transmitted to the receiver. In the receiver, the transform coefficients are inverse quantized and converted so that each blocks of original image is regenerated.

FIG. 1 shows a block diagram of a conventional digital motion picture coder/decoder, which is widely used in image processing system such as a High Definition Television (HDTV).

In FIG. 1, coder the motion picture coder comprises a differential image generator (DIG), 10 a discrete cosine transform unit (DCT unit), 11 a quantizer (Q), 12 a variable length coding unit (VLC unit), 19 an inverse quantizer (IQ), 13 an inverse discrete cosine transform unit (IDCT unit), 14 an adder (ADD), 15 a frame memory, a motion estimator, and a motion compensator 18.

In DIG 10 a current image and a predicted image are inputted, and a differential image is generated. The generated differential image is outputted to the DCT unit 11 to be divided into blocks. The DCT unit 11 processes every block into DCT coefficients. The DCT coefficients are then quantized according to a quantization step size in the quantizer 12. The quantized coefficients are coded according to the Huffman Table in the VLC unit 19. The quantized coded coefficients are then transmitted to the channel.

The predicted image inputted to the DIG 10 is obtained as following. First, quantized DCT coefficients from the quantizer 12 are quantized inversely in the inverse quantizer 13. The inverse quantized DCT coefficients are converted to image data in the IDCT 14. The converted image data are inputted to the adder. In the adder, original images are regenerated by using the transformed image data and previous image data from the motion compensator 18. The regenerated images from the adder are stored in the frame memory 16. From the frame memory 16, the previous images are outputted by delaying them in frame units. In the motion estimator, 17 the previous image signals from the frame memory 16 and the current image signals are compared for difference between the two frames, and a motion vector is generated. In the motion compensator, 18 the predicted image having a pixel value similar to the current frame is outputted by shifting the previous image signal outputted from the frame memory 16 as much as the motion vector.

In the motion picture coder 1 like the above, intra-mode frames are coded and transmitted. However, in the case of inter-mode frames, differential signals obtained through the motion estimation and the motion compensation should be coded and transmitted in order to decrease the transmission rate. To solve the above problem, a switch SW is disposed between the DIG 10 and the motion compensator 18. Accordingly, the switch is opened when the intra-frames are inputted, and the switch is closed when the inter-frames are inputted.

The motion picture decoder 2 comprises a variable length decoding unit (VLD unit) 20, an inverse quantizer (IQ) 21, an inverse discrete cosine transform unit (IDCT unit) 22, an adder (ADD) 23, a frame memory 24, and a motion compensator 25.

In the motion picture decoder, 2 the input image signals are decoded by the VLD unit 20. The decoded signals are then quantized inversely by the inverse quantizer 21. The inverse quantized image data are converted inversely by the IDCT unit 22 to be outputted to the adder 23. The image data from the adder 23 are stored and delayed in the frame memory 24. The consequent stored delayed data from the frame memory 24 are outputted to the motion compensator 25 in order to be compensated with reference to the previous images. The compensated signals are then outputted to the adder 23.

The intra-mode frames and inter-mode frames are regenerated according to the switch SW disposed between the adder 23 and motion compensator 25. Namely, in case of the intra-mode frames, the output data from the IDCT unit 22 are directly outputted to the adder 23. However, in case of the inter-mode frames, the output data from the IDCT unit 22 are added to the previous image data from the motion compensator and the resulting data are transmitted to the adder to regenerate a current image signal.

In the decoded digital images like the above, blocking effect occurs near to discontinuous boundary between blocks. The occurrence of this blocking effect is generated during the transform coding process of the divided blocks of digital images. Further, when the quantization step size is expanded during quantization, the quantization error increases and the blocking effect in the discontinuous boundary between blocks becomes even more apparent.

SUMMARY OF THE INVENTION

In view of the foregoing, it is an object of the present invention to provide methods and apparatuses for removing blocking effect due to a quantization error in a motion picture decoder having loss to the original image data.

In order to achieve the above object, the present invention provides a method for removing blocking effect in a motion picture decoder comprising the steps of extracting boundary pixel values of a current block; extracting boundary pixel values of each adjacent block; extracting difference values between boundary pixel values of the current block and boundary pixel values of each adjacent block; calculating the mean value for the difference values; limiting the mean value within a range of −(½) quantization step size to (½) quantization step size; and adding the limited mean value to each pixel value of the current block to output an image.

In addition, an apparatus for removing blocking effect in the motion picture decoder of the present invention comprises a frame memory for simultaneously receiving and storing decoded image signals in frame units and a corrected feedback current block with removed blocking effect; a current block boundary pixel extracting means for extracting boundary pixel values of the current block of frames stored in the frame memory; an adjacent block boundary pixel extracting means for extracting boundary pixel values of adjacent blocks of frames stored in the frame memory; a mean value calculating means for calculating difference values between boundary pixel values of the current block and of the adjacent blocks, and a mean value of the difference values; a mean value limiting means for limiting the mean value within a range of −(½) quantization step size to (½) quantization step size and outputting the limited mean value; a current block extracting means for extracting the current block of frames stored in the frame memory and outputting pixel values of the current block; and an adding means for adding the mean value from the mean value limiting means to each pixel value of the current block from the current block extracting means, outputting the corrected current block, and feeding back the corrected current block to the frame memory.

In another aspect, the present invention provides an apparatus for removing blocking effect comprising a frame memory for receiving and storing decoded image signals in frame units and a corrected feedback current block with removed blocking effect; a current block boundary pixel extracting means for extracting sequentially boundary pixel values of the current block stored in the frame memory; an adjacent block boundary extracting means for extracting sequentially boundary pixel values of adjacent blocks stored in the frame memory; an edge detecting means for outputting a first selection signal if the boundary pixel values of the current block are not an edge, whereas outputting a second selection signal if the boundary pixel values of the current block are an edge after receiving pixel values of the current block and boundary pixel values of the adjacent blocks; an input pixel extracting means for outputting in parallel a boundary pixel value of the current block and a plurality of upper and lower pixel values referencing the boundary pixel value of the current block as a center in accordance with an output order of boundary pixel values of the current block from the frame memory; a selecting means for inputting pixel values from the input pixel extracting means to a boundary pixel filtering means according to the first selection signal, and inputting directly pixel values from the input pixel extracting means to the frame memory according to the second selection signal; and a boundary pixel filtering means for feeding back corrected boundary pixel values to the frame memory by filtering the output pixel values from the selecting means.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 2A:
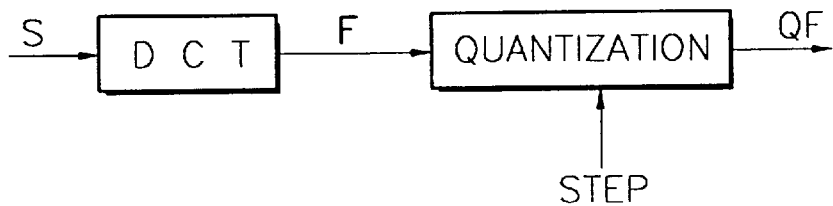
FIGS. 2A to 2D are views illustrating loss of an information due to a quantization error.
Figure 2B:
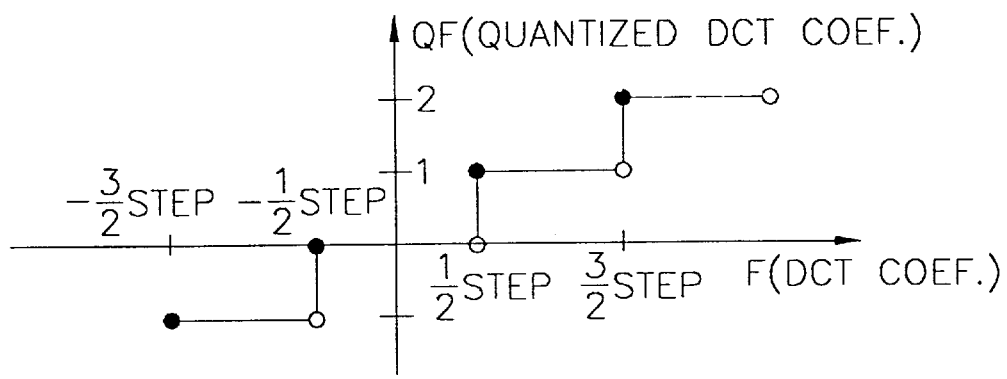
Figure 2C:
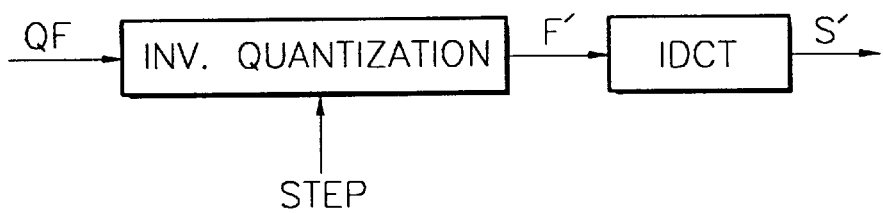
Figure 2D:
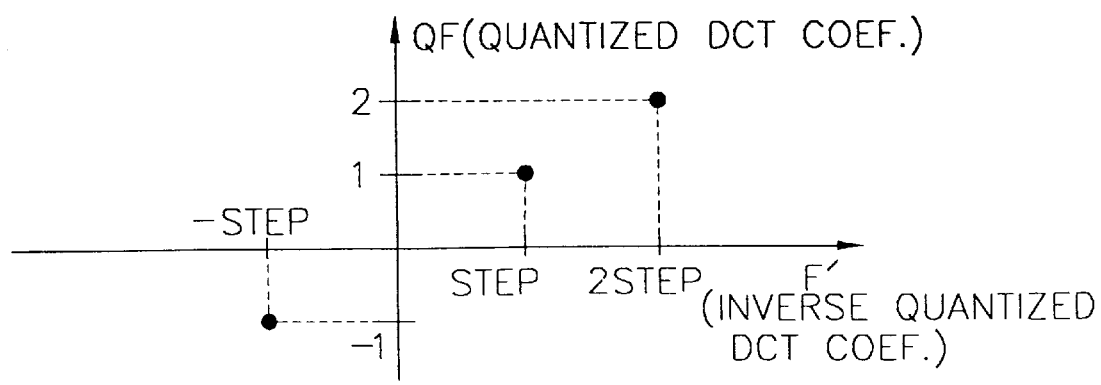

FIGS. 2A to 2D show a process of an information loss due to a quantization error. When a DCT coefficient is quantized according to a quantization step size, the quantized DCT coefficient is expressed by $$QF = \left[\frac{F}{step} + \frac{1}{2}\right]$$

where [ ] denotes Gaussian symbol, QF a quantized DCT coefficient, F a DCT coefficient and step a quantization step size, respectively. For example, in FIG. 2B, the quantized DCT coefficient value is QF=1, if the range of the DCT coefficient F is ½×step≦F<3/2×step. As shown in FIG. 2D, the inversely quantized DCT coefficient value F' is determined by expression F'=1×step when the above quantized DCT coefficient value QF=1 is quantized inversely. Accordingly, the difference (|F−F'|) between the original DCT coefficient value F and the inversely quantized DCT coefficient F' may be ½×step at its maximum. Namely, the quantization error |F−F'| which causes the blocking effect in the digital image falls within 0≦|F−F'|≦½×step.

Figure 1:
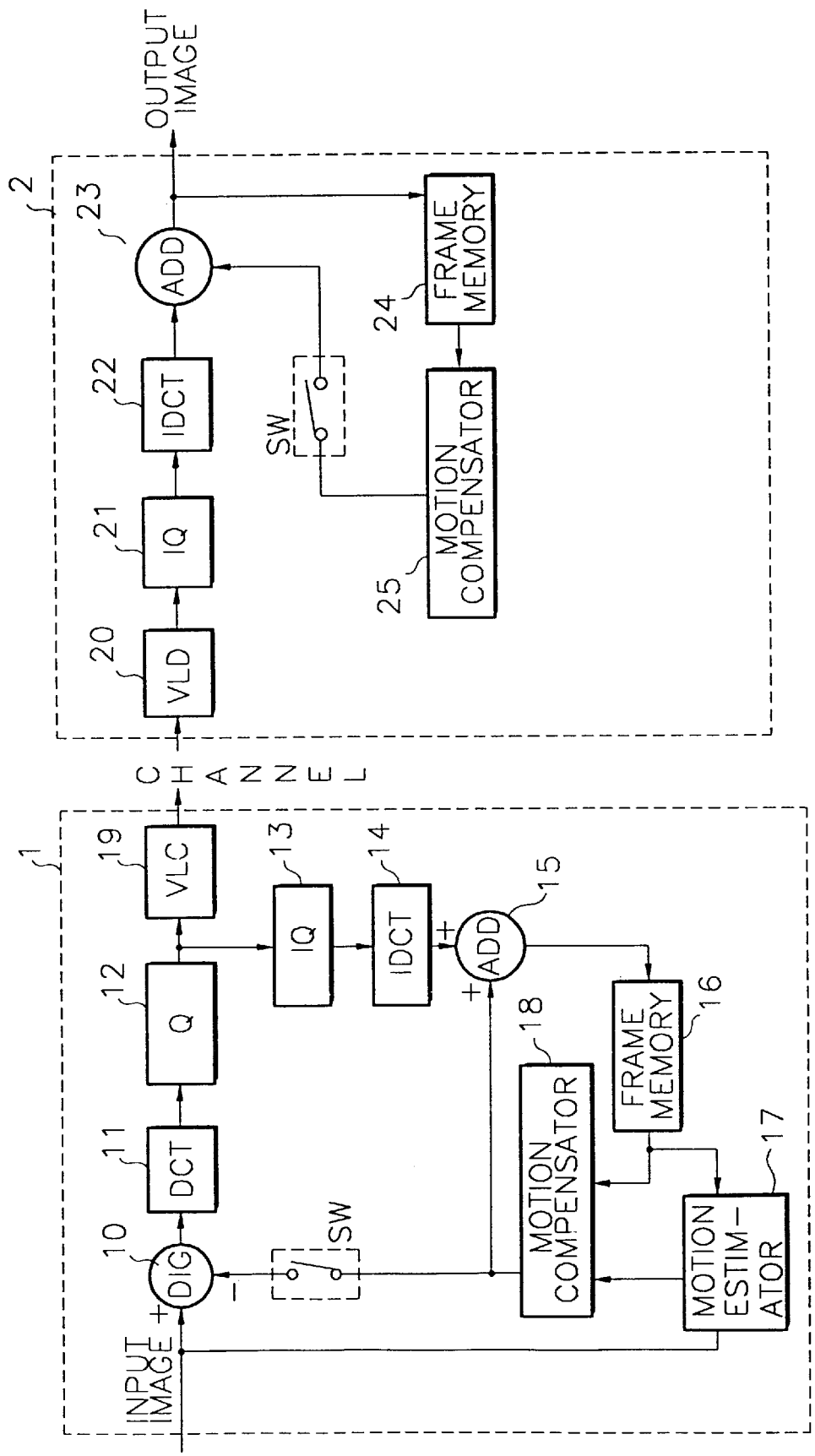
FIG. 1 is a block diagram illustrating a conventional motion picture coder and decoder.
Figure 3:
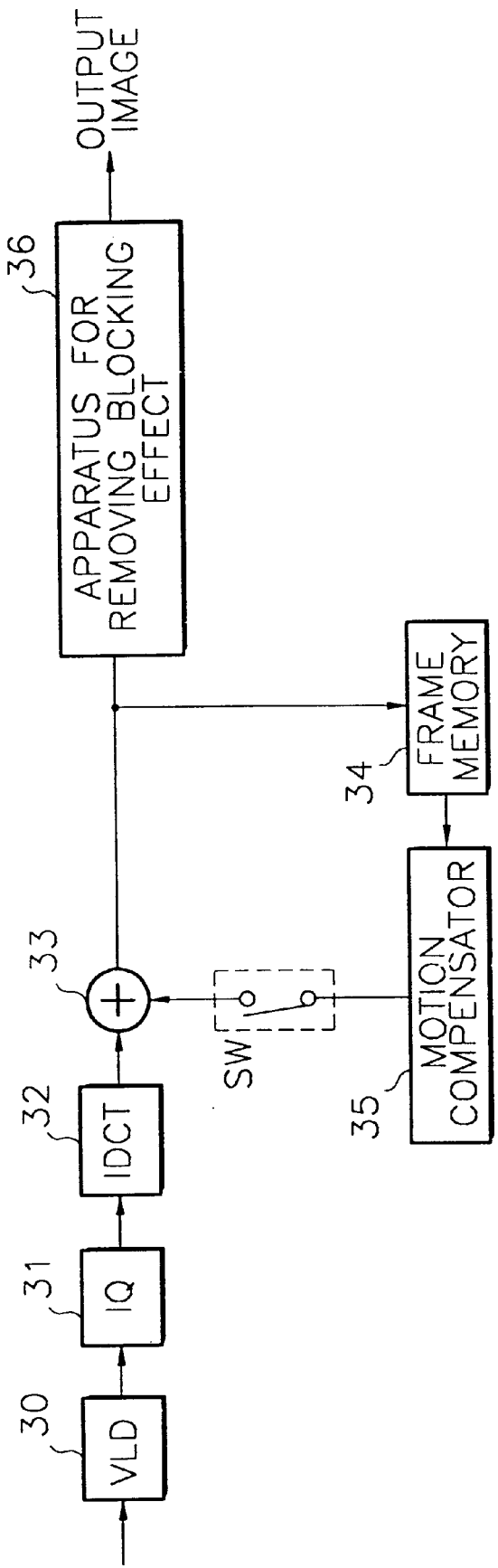
FIG. 3 is a block diagram illustrating a motion picture decoder comprising an apparatus for removing blocking effect in accordance with the present invention.

FIG. 3 shows a motion picture decoder comprising an apparatus for removing blocking effect 36 of the present invention, which is connected to an end portion of the decoder 2 in FIG. 1. Decoded image signals and a quantized step size information are inputted into the apparatus for removing blocking effect 36 such that blocking effects in the image signals are removed and the corrected image signals are outputted. The reference signs 30, 31, 32, 33, 34, 35 and SW correspond to a VLD unit, an inverse quantizer, an IDCT unit, an adder, a frame memory, a motion compensator and a switch, respectively.

Figure 4:
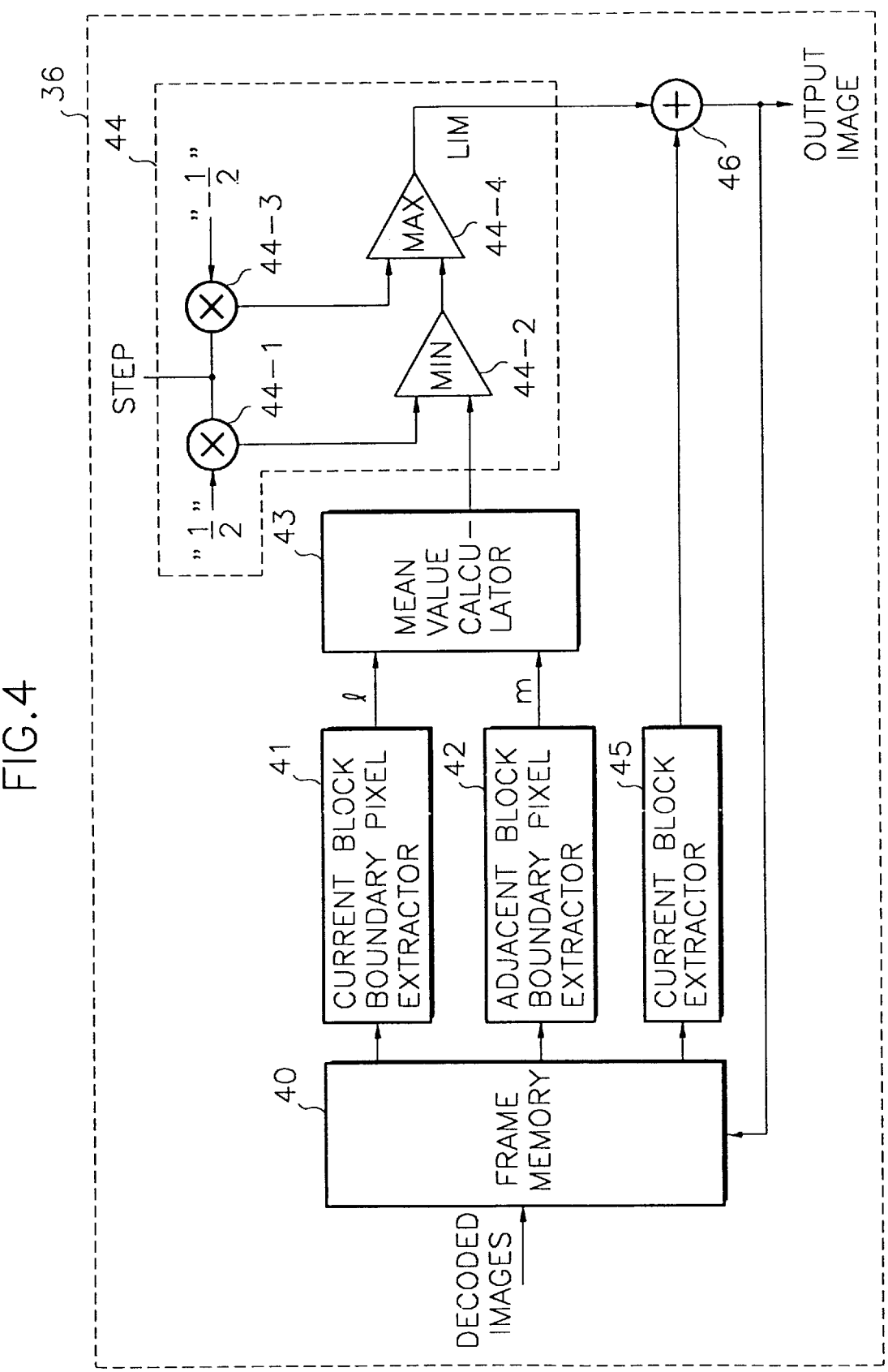
FIG. 4 is a block diagram illustrating an apparatus for removing blocking effect in accordance with a first preferred embodiment of the present invention.

FIG. 4 shows a first embodiment of the apparatus for removing blocking effect 36. The apparatus for removing blocking effect 36 comprises a frame memory 40; a current block boundary pixel extractor 41; an adjacent block boundary pixel extractor 42; a mean value calculator 43; a mean value limiter 44; a current block extractor 45; and an adder 46. The mean value limiter 44 comprises a multiply 44-1 for multiplying quantization step size by ½; a selector 44-2 for selecting and outputting a minimum MIN; a multiply 44-3 for multiplying the quantization step size by −½; and a selector 44-4 for selecting and outputting a maximum MAX.

Figure 5:
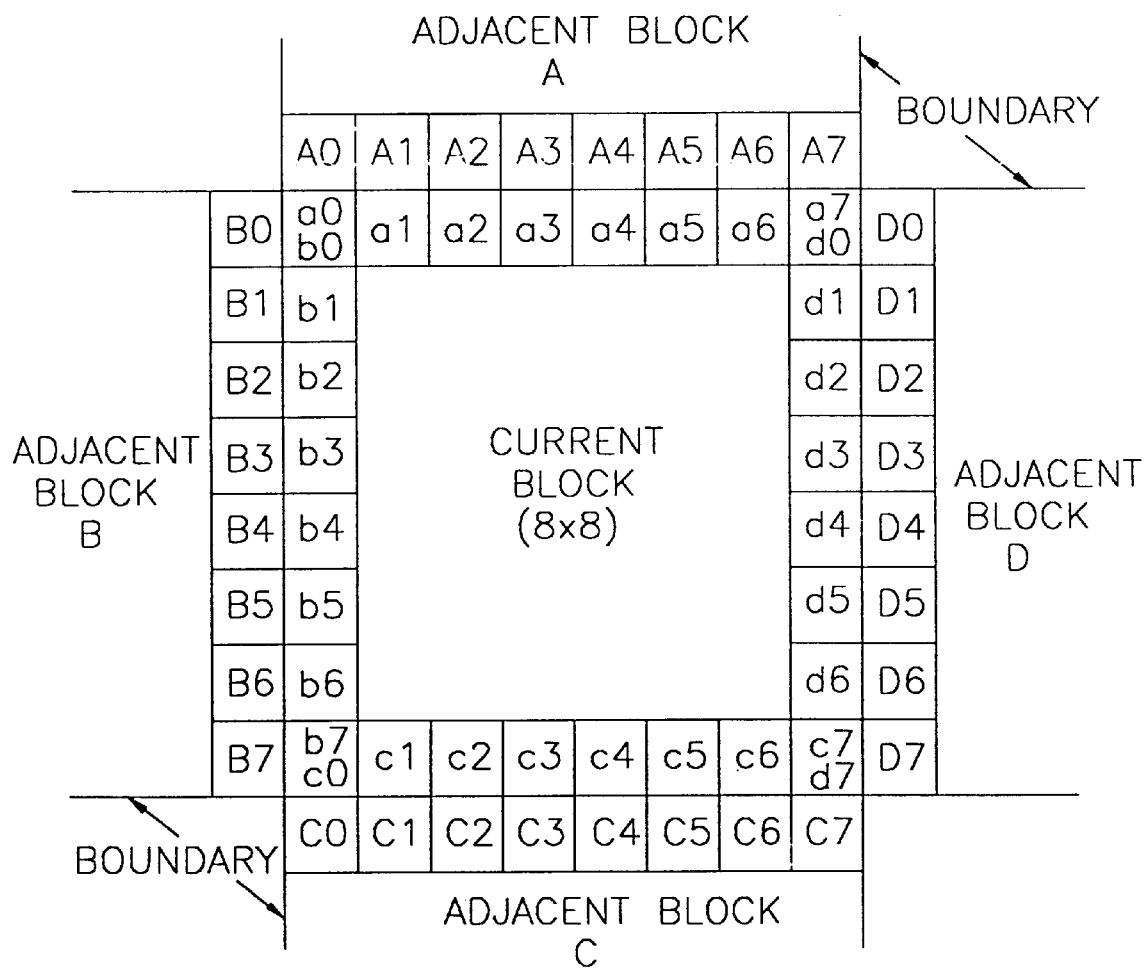
FIG. 5 is a view illustrating DCT transformed 8×8 pixels of current block and upper, lower, left, and right adjacent blocks.

FIG. 5 shows 8×8 pixels of current block, adjacent upper, lower, left, and right blocks and boundary pixels between each block. Here, the current block for removal of blocking effect is illustrated. The boundary pixels $a_0$–$a_7$ of the current block correspond to the boundary pixels $A_0$–$A_7$ of the upper adjacent block A. The boundary pixels $b_0$–$b_7$ of the current block correspond to the boundary pixels $B_0$–$B_7$ of the left adjacent block B. The boundary pixels $c_0$–$c_7$ of the current block correspond to the boundary pixels $C_0$–$C_7$ of the lower adjacent block C. The boundary pixels $d_0$–$d_7$ of the current block correspond to the boundary pixels $D_0$–$D_7$ of the right adjacent block D.

In FIG. 4, the decoded image signals are inputted and stored in the frame memory 40 in frame units. In the current block boundary pixel extractor 41, boundary pixel values l of the current block, and the adjacent blocks are extracted from the frame memory 40. Namely, 32 boundary pixel values $a_0$–$a_7$, $b_0$–$b_7$, $c_0$–$c_7$, $d_0$–$d_7$ are outputted sequentially from the current block boundary pixel extractor 41.

In addition, by the adjacent block boundary pixel extractor 42, boundary pixel values m of the adjacent blocks are extracted from the frame memory 40. Namely, 32 boundary pixel values $A_0$–$A_7$, $B_0$–$B_7$, $C_0$–$C_7$, $D_0$–$D_7$ are outputted sequentially from the adjacent block boundary pixel extractor 42.

In the mean value calculator 43, the boundary pixel values l of the current block and the boundary pixel values m of the adjacent blocks are sequentially inputted. Each difference value l-m between the inputted pixel values is calculated by the mean value calculator 43. Further, a mean value for each difference value is calculated and ouputted from the mean value calculator 43. The mean value is obtained by the following expression.

$$M = \frac{1}{32}\left[\sum_{i=0}^{7}(l_i - m_i)\right]$$

$$= \frac{1}{32}\left[\sum_{i=0}^{7}(a_i - A_i) + \sum_{i=0}^{7}(b_i - B_i) + \sum_{i=0}^{7}(c_i - C_i) + \sum_{i=0}^{7}(d_i - D_i)\right].$$

Equation 1

The above equation 1 is applied when there are 4 adjacent blocks. However, when there are 2 or 3 adjacent blocks, the mean value is obtained by dividing all the added boundary pixel values by 16 or 24 respectively.

In the mean value limiter 44, the mean value and a quantization step size are inputted. The inputted mean value is limited within a range of the minimum, –(½) quantization step size to the maximum, (½) quantization step size by the mean value limiter 44, and the limited mean value LIM is outputted. Namely, in the minimum selector 44-2, the mean value is compared to maximum ½×step to select a smaller value. In the maximum selector 44-4, the smaller value obtained from the minimum selector 44-2 is compared to the minimum –½×step to select a bigger value. The limited mean value LIM from the maximum selector 44-4 is outputted to the adder 46.

In the current block extractor 45, the current block is extracted from the frame memory 40. 64 pixel values of the extracted current block are sequentially outputted to the adder 46.

In the adder 46, the limited mean value LIM from the mean value limiter 44 is added to each pixel value of the current block outputted from the current block extractor 45.

The added and corrected current block is inputted into a display processor (not shown). In addition, the corrected current, block is fed back to the frame memory 40. In the frame memory 40, the stored current, block is replaced with the corrected currect block from the adder 46. This corrected current block is used for removal of blocking effect in the next block.

Another method for calculating the mean value utilizes a threshold level TH. The threshold level TH prevents a damage in edges of original image during the removal process of blocking effect. Once the threshold level is determined, absolute values of the difference values between the boundary pixel values of the current block and of the adjacent blocks are compared to the threshold level, respectively. Then, with respect to the absolute values smaller than the threshold level, the mean value M of the corresponding difference values is calculated. For example, when a 256 level image is coded/decoded, the threshold level is obtained as follows. A range of quantization error falls within –4 to 4 when the quantization step-size 8 is utilized, and a range of the absolute difference between boundaries of blocks can be predicted to be 0 to 8. Further, a mean absolute difference between the block boundaries is determined to be 4 if the quantization error is a uniform distribution. Accordingly, the threshold level greater than 4 is selected since the threshold level value must be greater than the differences of the boundary pixel values. Namely, when the determined threshold level is 4 and the absolute values $|l_i-m_i|$ of differences between the boundary pixel values less than or equal to 4 are selected to yield a mean value M. At this time, the mean value M is obtained by the following expression.

if $(|l_i-m_i| \leq TH)$ $\{S=S+(l_i-m_i), C=C+1\}$ $M=S/C$  Equation 2

(S and C are inititalized to 0 at each block)

The obtained mean value is inputted into the mean value limiter 44 for limiting the mean value within the range of quantization error.

Figure 6:
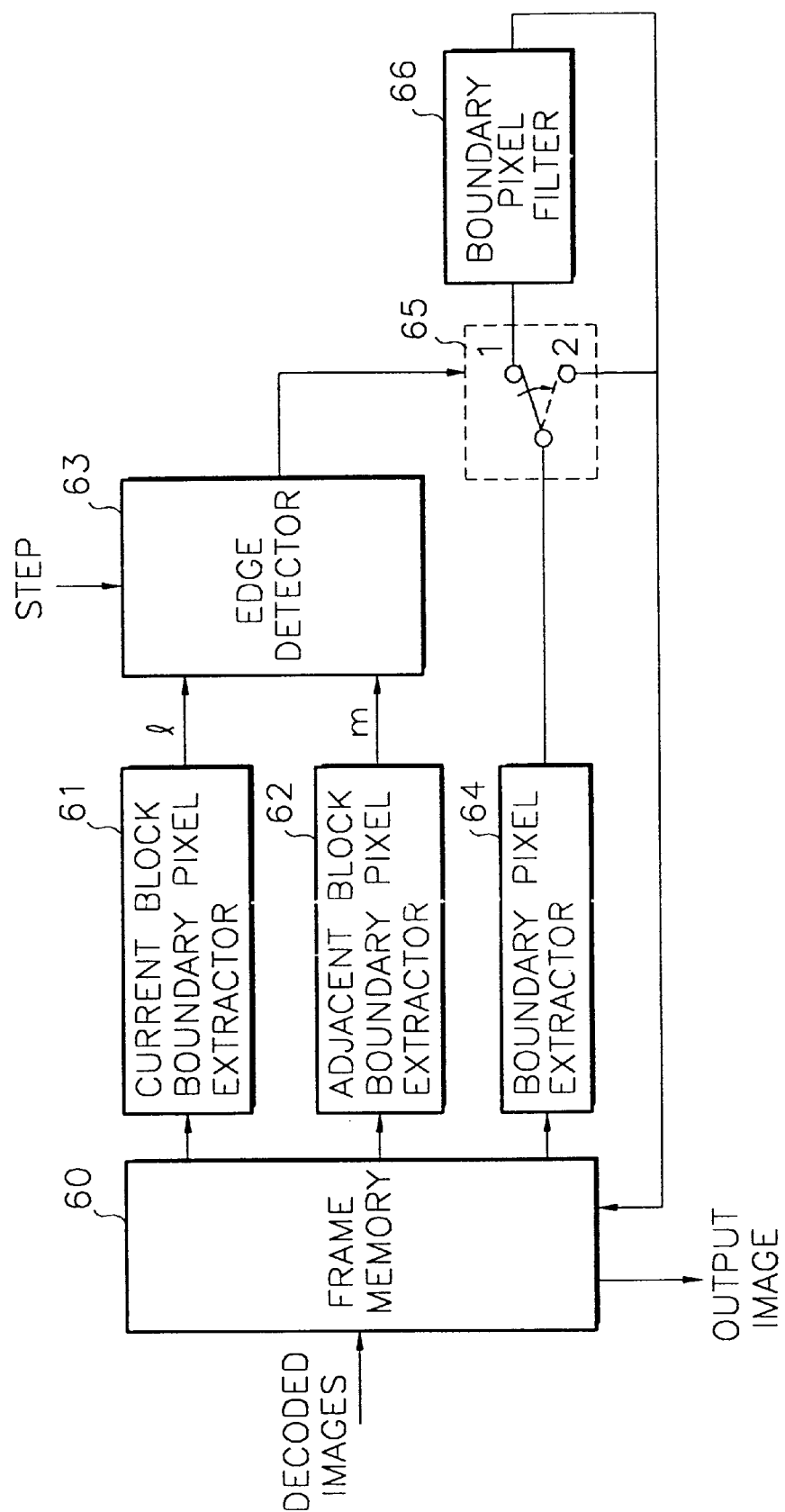
FIG. 6 is a block diagram illustrating an apparatus for removing blocking effect in accordance with a second preferred embodiment of the present invention.

FIG. 6 shows a second embodiment of the apparatus for removing blocking effect. When there is a drastic difference between the boundary pixel values of the current block and the boundary pixel values of the adjacent blocks, the difference is attributed by either quantization error, which occurred during transform coding or non-uniform (containing edge) current block. It is not desirable to indiscriminately utilize blocking effect removal process in existence of this difference, since the current block containing an edge would be distorted by the process. The second embodiment of the apparatus for removing blocking effect provides system for differentiating non-uniform block from uniform block to selectively remove blocking effect caused by the quantization error. The apparatus for removing blocking effect comprises a frame memory 60, a current block boundary pixel extractor 61, an adjacent block boundary pixel extractor 62, an edge detector 63, a boundary pixel extractor 64, a selector 65, and a boundary pixel filter 66.

In the frame memory 60, the decoded image signals are stored in frame units. The stored pixel values in the frame memory 60 are corrected by boundary pixel values of the feedback current block. When blocks corresponding to one frame are corrected, the corrected frame is outputted from the frame memory 60 to a display processor (not shown).

A role and an operation of the current block boundary pixel extractor 61 and the adjacent block boundary pixel extractor 62 are the same as those of the current block boundary pixel extractor 41 and the adjacent block boundary pixel extractor 42 of the first preferred embodiment.

In the edge detector 63, boundary pixel values l of the current block and boundary pixel values m of the adjacent blocks are inputted. According to the quantization step size, a first selection signal is outputted if the boundary of the current block is uniform (not an edge), whereas a second selection signal is outputted if the boundary of the current block is not uniform (an edge). After extracting absolute difference values between the boundary pixel values of the current block and the boundary pixel values of the adjacent blocks, if all the absolute difference values are less than equal to the threshold level, the edge detector 63 determines that the current block is uniform (edge free) and the removal of the blocking effect is needed. If any of all the absolute difference value is greater than the threshold level, the current block is determined to be non-uniform (containing edge) and the removal of the blocking effect is not needed.

For example, as in FIG. 5, consider that there are 4 adjacent blocks to the current block and the threshold level is 4. in the edge detector 63, 32 boundary pixel values $l_i$, $a_0$–$a_7$, $b_0$–$b_7$, $c_0$–$c_7$, $d_0$–$d_7$ are inputted sequentially from the current block boundary pixel extractor 61. In addition, in the edge detector 63, 32 boundary pixel values $m_i$, $A_0$–$A_7$, $B_0$–$B_7$, $C_0$–$C_7$, $D_0$–$D_7$ are inputted sequentially from the adjacent block boundary pixel extractor 62. The absolute difference values $|l_i-m_i|$ between each inputted pixel is obtained by the edge detector 63. After comparing 32 absolute difference values to the threshold level respectively, the first selection signal is outputted when each of 32 absolute difference values is $|l_i-m_i| \leq 4$, whereas the second selection signal is outputted when any of 32 absolute difference values is $|l_i-m_i| > 4$.

Figure 7:
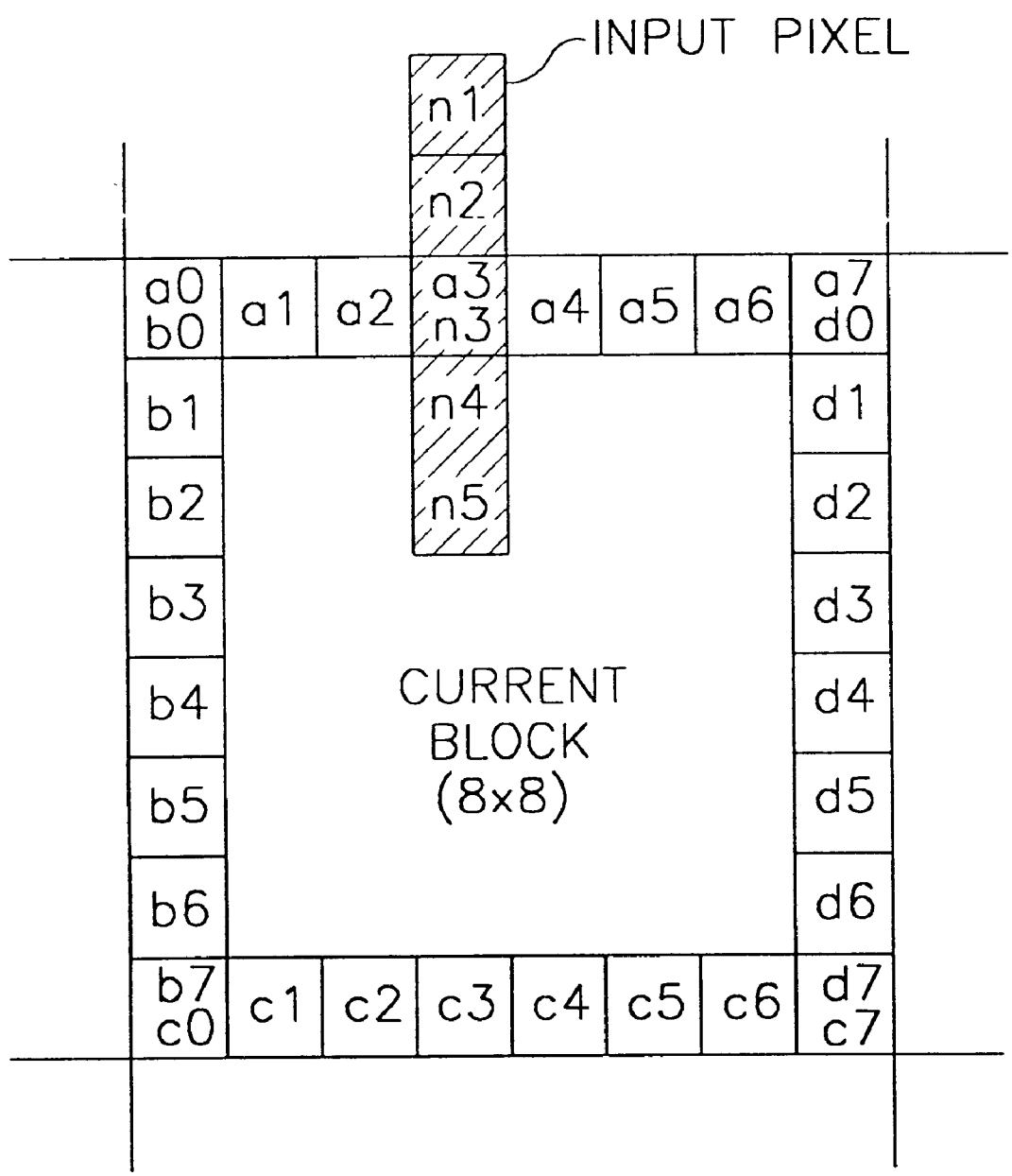
FIG. 7 is a view illustrating a plurality of pixels extracted from boundary pixels of a current block for describing an operation of an input pixel extractor in FIG. 6.

In the boundary pixel extractor 64, boundary pixel values $a_0$–$a_7$, $b_0$–$b_7$, $c_0$–$c_7$, $d_0$–$d_7$ of the current block from the frame memory 60 and upper and lower pixel values of the boundary pixel are extracted. The extracted pixel values are sequentially outputted in parallel. For example, as in FIG. 7, consider a boundary pixel value a3 of the current block. Two upper pixels and two lower pixels are additionally extracted centering a3. Then, assuming a3=n3, a total of 5 pixels n1, n2, n3, n4, n5 are outputted in parallel.

In the selector 65, the pixel values from the boundary pixel extractor 64 are inputted in the boundary pixel filter 66 according to the first selection signal. The pixel values outputted from the boundary pixel extractor 64 are directly fed back to the frame memory 60 in presence of second selection signal. That is, if the boundary pixel of the current block is determined not to have an edge according to the first selection signal, a plurality of adjacent pixels to the boundary pixel are outputted to the boundary pixel filter 66. If the boundary pixel of the current block is determined to have an edge according to the second selection signal, the boundary pixel is fed back to the frame memory 60.

In the boundary pixel filter 66, a plurality of boundary pixels outputted from the selector 65 are corrected. The corrected pixel values are inputted in the frame memory 60. Namely, the boundary pixel values are multiplied by filter coefficients respectively, and the sum of the multiplied values is the corrected pixel values. For example, the boundary pixel filter 66 functions as a low pass filter by utilizing a 5-tap mean filter having filter coefficients $$\left[\frac{1}{5}, \frac{1}{5}, \frac{1}{5}, \frac{1}{5}, \frac{1}{5}\right].$$

When the boundary pixel value n3(=a3) of the current block and pixel values n1, n2, n4, n5 are extracted from the boundary pixel extractor 64, the corrected boundary pixel values by the boundary pixel filter 66 are $$\left[\frac{1}{5}n_1, \frac{1}{5}n_2, \frac{1}{5}n_3, \frac{1}{5}n_4, \frac{1}{5}n_5\right].$$

As described above, the block not having an edge is filtered, whereas the block detected to have an edge is not filtered. Accordingly, the removal of the blocking effect is processed selectively without distorting the original images.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A method for removing blocking effect comprising the steps of:

a) extracting boundary pixel values of a current block and each adjacent block to said current block;

b) extracting difference values between the boundary pixel values of said current block and the boundary pixel values of each said adjacent block, and calculating a mean value for the difference values;

c) limiting the mean value within a range of $-\frac{1}{2}$ quantization step size to $\frac{1}{2}$ quantization step size; and d) adding the limited mean value to each said pixel value of said current block, and outputting corrected images.

2. The method for removing blocking effect in a motion picture decoder of claim 1, wherein said step of calculating the mean value comprises the steps of:

calculating difference values between boundary pixel values of said current block and of said adjacent blocks; and calculating a mean value for the difference values.

3. An apparatus for removing blocking effect in a motion picture decoder comprising:

a frame memory for receiving and storing decoded image signals in frame units and a corrected feedback current block;

a current block boundary pixel extracting means for extracting sequentially boundary pixel values of said current block stored in the frame memory;

an adjacent block boundary extracting means for extracting sequentially boundary pixel values of adjacent blocks to said current block stored in the frame memory;

a mean value calculating means for calculating a mean value for difference values between the boundary pixel values of said current block and of said adjacent blocks, and outputting the mean value;

a mean value limiting means for limiting the mean value within a range of $-\frac{1}{2}$ quantization step size to $\frac{1}{2}$ quantization step size, and outputting the limited mean value;

a current block extracting means for extracting a current block stored in the frame memory, and outputting pixel values of said current block; and an adding means for adding the mean value from said mean value limiting means to each pixel value of said current block from said current block extracting means for outputting the corrected current block, and feeding back said corrected current block to said frame memory.

4. The apparatus for removing blocking effect in a motion picture decoder of claim 3, wherein the mean value limiting means comprises:

- a first multiplying means for multiplying a predetermined quantization step size by ½;
- a first selecting means for selecting and outputting a minimum by comparing the mean value provided from said mean value calculating means to the output from said first multiplying means;
- a second multiplying means for multiplying the quantization step size by −½; and
- a second selecting means for selecting and outputting a maximum by comparing the output provided from said first selection means to the output from said second multiplying means.

5. An apparatus for removing blocking effect in a motion picture decoder comprising:

- a frame memory for receiving and storing decoded image signals in frame units and a corrected feedback current block;
- a current block boundary pixel extracting means for extracting sequentially boundary pixel values of a current block stored in the frame memory;
- an adjacent block boundary extracting means for extracting sequentially boundary pixel values of adjacent blocks to said current block stored in the frame memory;
- an edge detecting means for outputting a first selection signal if the current block does not contain an edge, whereas outputting a second selection signal if said current block contains an edge after receiving pixel values of said current block and boundary pixel values of an adjacent block;
- a boundary pixel extracting means for extracting and outputting in parallel a boundary pixel value of the current block and a plurality of upper and lower pixel values referencing said boundary pixel value of the current block as a center according to an output order of boundary pixel values of said current block from said frame memory;
- a selecting means for inputting the boundary pixel values from said boundary pixel extracting means so as to be filtered according to the first selection signal, and inputting directly the boundary pixel values from said boundary pixel extracting means to said frame memory according to the second selection signal; and
- a boundary pixel filtering means for filtering the boundary pixel values from said selecting means and feeding back corrected boundary pixel values to said frame memory.

6. The apparatus for removing blocking effect in a motion picture decoder of claim 8, wherein said edge detecting means comprises:

- a subtracting means for calculating difference values between the boundary pixel values of said current block and of said adjacent blocks;
- an absolute value calculating means for calculating absolute values of the difference values; and
- a selection signal generating means for outputting the first selection signal if all absolute values of the difference values are less than or equal to a threshold level, whereas outputting the second selection signal if any of all absolute values of the difference values is more than the threshold level, by comparing all absolute values of the difference values and the threshold level.

7. The apparatus for removing blocking effect in a motion picture decoder of claim 5, wherein said boundary pixel filtering means is a low pass filter.

* * * * *